(12) United States Patent
Ostergaard

(10) Patent No.: US 8,031,186 B2
(45) Date of Patent: Oct. 4, 2011

(54) OPTICAL TOUCHPAD SYSTEM AND WAVEGUIDE FOR USE THEREIN

(75) Inventor: Jens Wagenblast Stubbe Ostergaard, Roskilde (DK)

(73) Assignee: FlatFrog Laboratories AB, Lund (SE)

( * ) Notice: Subject to any disclaimer, the term of this patent is extended or adjusted under 35 U.S.C. 154(b) by 778 days.

(21) Appl. No.: 11/480,865

(22) Filed: Jul. 6, 2006

(65) Prior Publication Data

US 2008/0007540 A1  Jan. 10, 2008

(51) Int. Cl.
*G06F 3/042* (2006.01)
(52) U.S. Cl. .......................................... 345/176
(58) Field of Classification Search .......... 345/173–179, 345/168, 156; 250/221, 222.2; 702/19, 150; 356/614; 385/13
See application file for complete search history.

(56) References Cited

U.S. PATENT DOCUMENTS

| | | | |
|---|---|---|---|
| 4,180,702 A | 12/1979 | Sick et al. | 250/227.11 |
| 4,346,376 A | 8/1982 | Mallos | 340/712 |
| 4,484,179 A * | 11/1984 | Kasday | 345/176 |
| 4,542,375 A | 9/1985 | Alles et al. | 340/712 |
| 5,600,105 A | 2/1997 | Fukuzaki et al. | 178/19 |
| 5,672,852 A | 9/1997 | Fukuzaki et al. | 178/19 |
| 5,686,942 A | 11/1997 | Ball | 345/158 |
| 5,729,249 A | 3/1998 | Yasutake | 345/173 |
| 5,945,980 A | 8/1999 | Moissev et al. | 345/173 |
| 6,061,177 A * | 5/2000 | Fujimoto | 359/443 |
| 6,227,667 B1 | 5/2001 | Halldorsson et al. | 351/206 |
| 6,380,732 B1 | 4/2002 | Gilboa | 324/207.17 |
| 6,390,370 B1 | 5/2002 | Plesko | 235/462.49 |
| 6,660,964 B1 | 12/2003 | Benderly | 219/121.74 |
| 6,799,141 B1 | 9/2004 | Stoustrup et al. | 702/159 |
| 7,133,031 B2 | 11/2006 | Wang et al. | 345/173 |
| 7,442,914 B2 | 10/2008 | Eliasson et al. | 250/221 |
| 2002/0158823 A1 | 10/2002 | Zavracky et al. | 345/87 |
| 2002/0158853 A1 * | 10/2002 | Sugawara et al. | 345/176 |
| 2003/0137494 A1 | 7/2003 | Tulbert | 345/173 |
| 2003/0156100 A1 | 8/2003 | Gettemy | 345/204 |
| 2003/0214486 A1 * | 11/2003 | Roberts | 345/173 |
| 2004/0027339 A1 | 2/2004 | Schulz | 345/173 |

(Continued)

FOREIGN PATENT DOCUMENTS

DE  10139147 A1  3/2003

(Continued)

OTHER PUBLICATIONS lizuka, Keigo. "Elements of Photonics, vol. I: In Free Space and Special Media." Jun. 15, 2002. John Wiley & Sons, Inc. Chapter 2, pp. 110-165.*

*Primary Examiner* — Chanh Nguyen
*Assistant Examiner* — Allison Walthall
(74) *Attorney, Agent, or Firm* — Pillsbury Winthrop Shaw Pittman LLP

(57) ABSTRACT

An optical touchpad system is disclosed that may be easily integrated into a variety of applications. One feature of the optical touchpad system that may contribute to this versatility may be the ability of the optical touchpad system to function in the same manner independent from a topology and/or opacity of an interface surface of the optical touchpad system. This may enable the interface surface to be composed of any of a variety of materials. This may further enable the interface surface to include various topologies adapted for the application in which the optical touchpad system may be employed.

23 Claims, 4 Drawing Sheets

U.S. PATENT DOCUMENTS

| | | | |
|---|---|---|---|
| 2004/0032401 A1 | 2/2004 | Nakazawa et al. | 345/173 |
| 2004/0238627 A1 | 12/2004 | Silverbrook et al. | 235/382 |
| 2004/0239702 A1 | 12/2004 | Kang et al. | 345/863 |
| 2004/0252091 A1 | 12/2004 | Ma et al. | 345/87 |
| 2004/0252867 A1* | 12/2004 | Lan et al. | 382/124 |
| 2005/0156914 A1 | 7/2005 | Lipman et al. | 345/179 |
| 2005/0212774 A1 | 9/2005 | Ho et al. | 345/173 |
| 2005/0248540 A1 | 11/2005 | Newton | 345/173 |
| 2005/0253834 A1 | 11/2005 | Sakamaki et al. | 345/207 |
| 2006/0001653 A1 | 1/2006 | Smits | 345/176 |
| 2006/0017706 A1 | 1/2006 | Cutherell et al. | 345/173 |
| 2006/0033725 A1 | 2/2006 | Marggraff et al. | 345/179 |
| 2006/0256092 A1 | 11/2006 | Lee | 345/173 |
| 2006/0279558 A1 | 12/2006 | Van Delden et al. | 345/176 |
| 2006/0281543 A1 | 12/2006 | Sutton et al. | 463/29 |
| 2006/0290684 A1 | 12/2006 | Giraldo et al. | 345/175 |
| 2007/0052684 A1* | 3/2007 | Gruhlke et al. | 345/173 |
| 2007/0125937 A1* | 6/2007 | Eliasson et al. | 250/221 |
| 2007/0152985 A1* | 7/2007 | Ostergaard et al. | 345/176 |
| 2009/0135162 A1 | 5/2009 | Van De Wijdeven et al. | 345/175 |

FOREIGN PATENT DOCUMENTS

| | | |
|---|---|---|
| EP | 1 457 870 | 9/2004 |
| GB | 2 409 515 | 6/2005 |
| WO | WO 84/03186 | 8/1984 |
| WO | WO 2004/081502 | 9/2004 |
| WO | WO 2004/081956 | 9/2004 |
| WO | WO 2005/026938 | 3/2005 |
| WO | WO 2005/029172 | 3/2005 |
| WO | WO 2005029172 A2 * | 3/2005 |
| WO | WO 2005029395 A2 * | 3/2005 |
| WO | WO 2005/125011 | 12/2005 |
| WO | WO 2006/124551 | 11/2006 |

* cited by examiner

OPTICAL TOUCHPAD SYSTEM AND WAVEGUIDE FOR USE THEREIN

FIELD OF THE INVENTION

The invention relates to a optical touchpad system, with a multilayer waveguide that includes at least one total internal reflection mirror, for determining information relating to an engagement between an object and an interface surface of the optical touchpad system.

BACKGROUND OF THE INVENTION

Generally, touchpad systems are implemented for a variety of applications. Some of these applications include, computer interfaces, keypads, keyboards, and other applications. Various types of touch pads are known. Optical touch pads have certain advantages over some other types of touch pads at least for some applications. Various types of optical touchpad systems may be used in some or all of these applications. However, conventional optical touchpad systems may include various drawbacks. For example, conventional optical touchpad systems may be costly, imprecise, temperamental, fragile, energy inefficient, or may have other weaknesses and/or drawbacks. Further, conventional systems may require that an interface surface (e.g. a surface that is engaged by a user) have a generally planar, or otherwise uniform topology. Some conventional optical touchpads may require that light reach the interface surface to enable an object in engagement with the interface surface to interact with the light. Thus some, conventional optical touchpad systems may require that the interface surface be either (i) predominantly transparent, or (ii) predominantly opaque. These limitations on topology and/or opacity may restrict the use of these systems with respect to some of the applications for touchpad systems. Various other drawbacks exist with known touchpads, including optical touchpads.

SUMMARY OF THE INVENTION

One aspect of the invention relates to an optical touchpad system including a waveguide having a plurality of waveguide layers. For example, the waveguide may include an interface layer, an irradiation layer, a signal layer, and/or other layers. The interface layer may be defined by a first surface, a second surface and a relatively rigid material between the first and the second surface of the interface layer. The material between the first and the second surface of the interface layer may be opaque and/or or may be transparent. The material forming the interface layer may have a first index of refraction. The irradiation layer may be defined by a first surface, a second surface and may include a relatively pliable, transparent material having a second index of refraction that is greater than the first index of refraction. The signal layer may be defined by a first surface, a second surface and a transparent material having a third index of refraction that is less than the second index of refraction between the first and the second surface of the signal layer.

The first surface of the interface layer may comprise an interface surface. The interface surface may be configured to be engaged by a user by use of an animate object (e.g., one or more finger) or an inanimate object (e.g., a stylus or other object). The engagement may include the user depressing a portion of the interface surface. The second surface of the interface layer may be located adjacent to the first surface of the irradiation layer. The second surface of the irradiation layer may be adjacent to the first surface of the signal layer. At the boundary between the interface layer and the irradiation layer a reflective surface may be formed to reflect light incident on the boundary from within the irradiation layer back into the irradiation layer. In some instances, the reflective surface may include a first total internal reflection mirror created by the first and second refractive indices of the materials in the interface layer and the irradiation layer. The first total internal reflection mirror may have a first critical angle. The boundary between the irradiation layer and the signal layer may form a second total internal reflection mirror having a second critical angle. The second total internal reflection mirror may be configured to reflect light incident on the second total internal reflection mirror from within the irradiation layer back into the irradiation layer.

In some instances, including implementations in which the interface layer includes an opaque material between the first and the second surfaces of the interface layer, the waveguide may be configured to reflect light at the boundary between the interface layer and the irradiation layer by reflection other than total internal reflection. For example, a reflective layer may be disposed between the interface layer and the irradiation layer (e.g., by applying a thin film, by sputtering a coating or film, etc.) that reflects light from with the irradiation layer back into the irradiation layer without substantial variation based on the angle of incidence of the light. As another example, the opaque material between the first and second surfaces of the interface layer may inherently provide reflection at the boundary between the interface layer and the irradiation layer by reflection other than total internal reflection (e.g., the material includes a metal). As yet another example, one or more interference mirrors may be provided at the boundary between the interface layer and the irradiation layer to reflect radiation appropriately.

At least one of the layers (e.g. the irradiation layer) may be optically coupled to one or more electromagnetic radiation emitters to receive electromagnetic radiation (e.g., light) emitted therefrom. One or more of the layers (e.g., the signal layer) may be optically coupled to one or more sensors.

In operation, according to one embodiment, light received by the irradiation layer is normally trapped within the irradiation layer at least in part by reflection at the boundary between the interface layer and the irradiation layer (e.g., total internal reflection, etc.) and by total internal reflection at the total internal reflection mirror formed at the boundary between the irradiation layer and the signal layer. Engagement of the interface surface with an object causes the irradiation layer to at least partially deform. This deformation of the irradiation layer may interact (e.g., deflect, scatter, etc.) with the light, or other electromagnetic radiation, in the irradiation layer, such that the angle of incidence of at least a portion of the light incident on the second surface of the irradiation layer, which is normally trapped within the irradiation layer, becomes incident on the second surface of the irradiation layer with an angle of incidence that is less than the critical angle of the total internal reflection mirror formed at the second surface by the boundary between the irradiation layer and the signal layer. Thus, this light is leaked from the irradiation layer to the signal layer. The leaked light is then guided to the one or more sensors at least in part by reflection at the second surface of the signal layer. The one or more sensors may detect one or more properties of the light to determine information about the engagement of the interface surface and the object (e.g., the position of engagement, the force applied to the interface surface by the object, etc.).

This configuration of optical touchpad provides various advantages over known touchpads. For example, the optical touchpad that may be able to function independent from a topology and/or opacity of an interface surface of the optical touchpad. This may enable the interface surface to be composed of any of a variety of materials (e.g., metal, wood, colored glass, colored polymers, clear glass, clear polymers, etc.). This may further enable the interface surface to include various topologies adapted for different applications in which the optical touchpad may be employed (e.g., appliances, doorbells, remote controls, personal electronics, keyboards, antiglare finishes, camera lenses, scroll buttons, tactile control input, Braille text, joysticks, applicable buttons, etc.). The operation of the optical touchpad may further enable an enhanced frame rate, reduced optical noise in the optical signal(s) guided to the one or more sensors, augment the ruggedness of the optical touchpad, and/or provide other advantages.

In some implementations, the optical touchpad system comprises one or more emitters, one or more sensors, a waveguide, and one or more processors. The emitters emit electromagnetic radiation, and may be optically coupled with the waveguide so that electromagnetic radiation emitted by the emitters may be directed into the waveguide. The detectors may be configured to monitor one or more properties of electromagnetic radiation. For instance, the one or more properties may include intensity, directionality, frequency, amplitude, amplitude modulation, and/or other properties. The detectors may include one or more photosensitive sensors that receive electromagnetic radiation, and output one or more output signals that are indicative of one or more of the properties of the received electromagnetic radiation. The detectors may be optically coupled to the waveguide to receive electromagnetic radiation from the waveguide, and may output one or more output signals that are indicative of one or more properties of the electromagnetic radiation received from the waveguide. The processor may be operatively coupled with the detectors to receive the one or more output signals generated by the detectors. Based on the received output signals, the processor may determine information about an engagement between an object and an interface surface of the optical touchpad system formed by the waveguide.

These and other objects, features, benefits, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION

Figure 1:
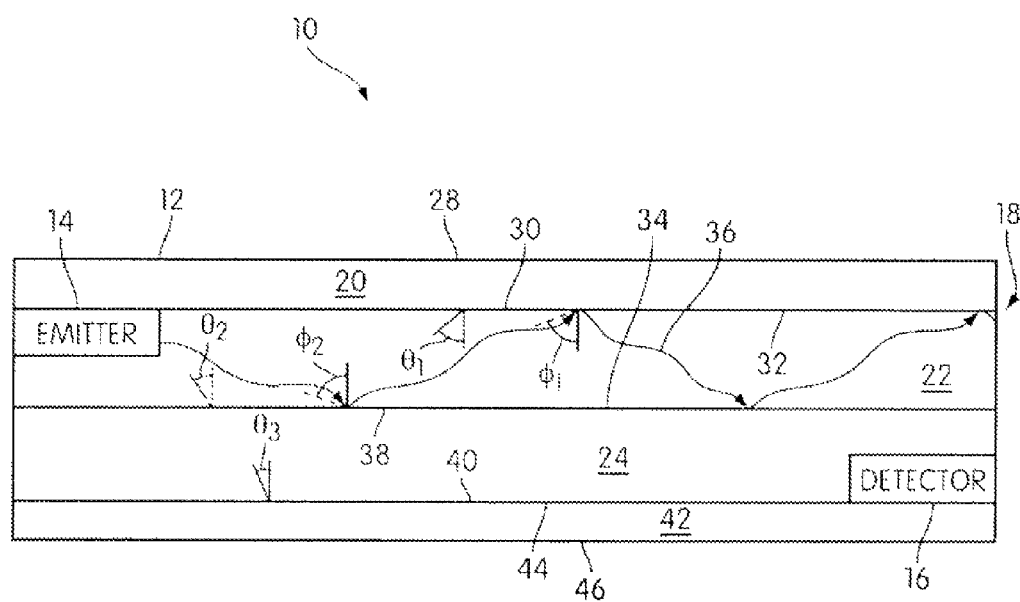
FIG. 1 illustrates a side elevation of an optical touchpad system, in accordance with one or more embodiments of the invention.

FIG. 1 illustrates an optical touchpad system 10 according to one or more embodiments of the invention. Optical touchpad system 10 may include an interface surface 12, one or more emitters 14, one or more detectors 16, and a waveguide 18. Interface surface 12 is configured such that a user can engage interface surface 12 with an object (e.g., a fingertip, a stylus, etc.). Optical touchpad system 10 detects a position of the engagement between interface surface 12 and the object.

Emitters 14 emit electromagnetic radiation, and may be optically coupled with waveguide 18 so that electromagnetic radiation emitted by emitters 14 may be directed into waveguide 18. Emitters 14 may include one or more Organic Light Emitting Devices ("OLEDs"), lasers (e.g., diode lasers or other laser sources), Light Emitting Devices ("LEDs"), Hot Cathode Fluorescent Lamps ("HCFLs"), Cold Cathode Fluorescent Lamps ("CCFLs") incandescent lamps, halogen bulbs, received ambient light, and/or other electromagnetic radiation sources. In some embodiments, emitters 14 may be disposed at the periphery of waveguide 18 in optical touchpad system 10 (e.g., as illustrated in FIG. 1). However, this is not limiting and alternative configurations exist. For example, emitters 14 may be disposed away from waveguide 18 and electromagnetic radiation produced by emitters 14 may be guided to waveguide 18 by additional optical elements (e.g., one or more optical fibers, etc.). As another example, some or all of emitters 14 may be embedded within waveguide 18 beneath interface layer 12 at locations more central to optical touchpad system than those shown in FIG. 1.

Detectors 16 may monitor one or more properties of electromagnetic radiation. For instance, the one or more properties may include intensity, directionality, frequency, amplitude, amplitude modulation, and/or other properties. Detectors 16 may include one or more photosensitive sensors (e.g., one or more photosensitive diodes, CCD arrays, CMOS arrays, line sensors etc.) that receive electromagnetic radiation, and may output one or more output signals that are indicative of one or more of the properties of the received electromagnetic radiation. As will be discussed further below, detectors 16 may include spatial filters (e.g., one or more apertures, slits, sets of slits, refractive elements, etc.) to filter the electromagnetic radiation before it becomes incident on the photosensitive sensor(s). In some implementations, detectors 16 may be optically coupled to waveguide 18 to receive electromagnetic radiation from waveguide 18, and may output one or more output signals that are indicative of one or more properties of the electromagnetic radiation received from waveguide 18. Based on these output signals, information about the engagement between the object and interface surface 12 may be determined (e.g., position, force of engagement, etc.)

In some implementations, waveguide 18 may include a plurality of waveguide layers. For example, waveguide 18 may include an interface layer 20, an irradiation layer 22, a signal layer 24, and/or other layers. Waveguide 18 may receive electromagnetic radiation from emitters 14 and direct a portion of the received electromagnetic radiation to detectors 16 such that information regarding the engagement between the object and interface surface 12 may be determined.

As can be seen in FIG. 1, interface layer 20 may be defined by a first surface 28, a second surface 30 and may be formed of a flexible, relatively rigid material disposed between first and second surfaces 28 and 30. For instance, interface layer 20 may be formed from metal, wood, colored class, colored polymers, ceramics, polyethylene terephthalate ("PET"), polycarbonate, silicone, polyurethane, FEP, and/or other materials. In some implementations, the material forming interface layer 20 may be transparent to enable electromagnetic radiation to pass into and out of waveguide 18 via interface surface 12. However, this is not always the case, as will be discussed further below. Interface layer 20 may include a material having a first index of refraction. Although interface layer 20 is shown in FIG. 1 as a single contiguous layer, in some implementations, interface layer 20 may be a composite layer including a plurality of separate layers of the same, or different, materials. For instance, in implementations in which interface layer 20 includes substantially opaque interface surface 12, interface layer 20 may include a first layer that provides interface surface and a second layer disposed between the first layer and irradiation layer 22 that is formed from a material that is not opaque (e.g., transparent) and has a predetermined index of refraction (e.g., the first index of refraction).

Irradiation layer 22 may be defined by a first surface 32 and a second surface 34, and may be formed from a transparent material having a second index of refraction. For example, irradiation layer 22 may be formed from glass, PET, polycarbonate, silicone, PP, ABS, polyurethane, and/or other transparent materials. In some instances, the transparent material that forms irradiation layer 22 may be relatively pliable. In various ones of these instances, the pliability of irradiation layer 22 may be a known value.

In implementations in which interface layer 20 includes a layer formed from a transparent material, the second index of refraction may be greater than the first index of refraction. Irradiation layer 22 is illustrated in FIG. 1 as being disposed adjacent to interface layer 20 within waveguide 18 such that second surface 30 of interface layer 20 is near or in contact with first surface 32 of irradiation layer 22. Irradiation layer 22 may be optically coupled with emitters 14 to receive electromagnetic radiation therefrom. In some instances, additional optical components (not shown) may guide radiation emitted by emitters 14 into irradiation layer 22. In some other instances, emitters 14 may be integrally formed within, or positioned directly adjacent to, irradiation layer 22.

Figure 2:
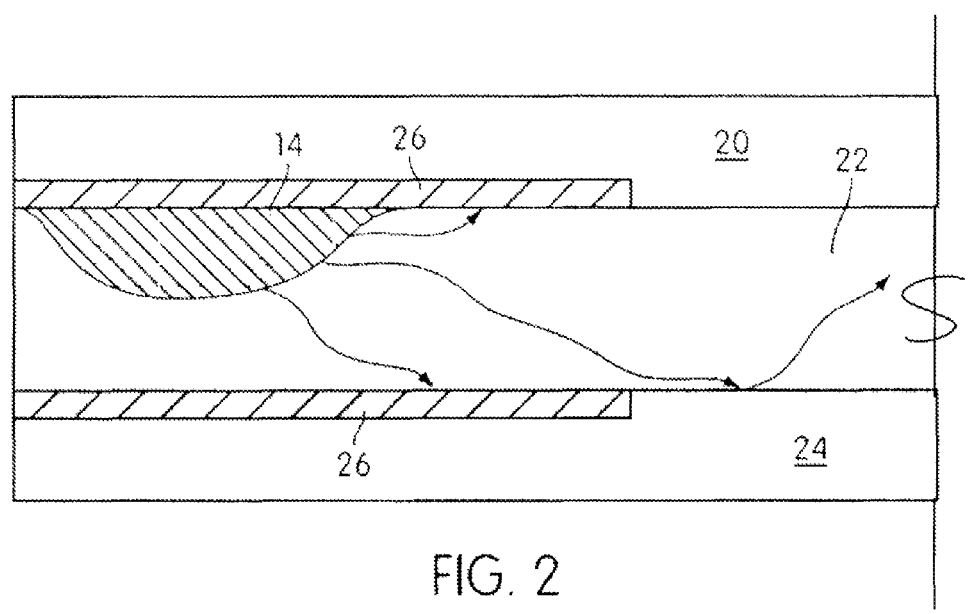
FIG. 2 illustrates an arrangement of an emitter within an optical touchpad system, according to one or more embodiments of the invention.

Turning briefly to FIG. 2, in some implementations, absorption materials 26 that absorb electromagnetic radiation emitted by emitters 14 at relatively low angles of incidence to the surfaces that bound irradiation layer 22 may be provided within waveguide 18. In the implementations illustrated in FIG. 2, emitter 14 may include a side emitting OLED formed within irradiation layer 22. Absorption material 26 may be provided adjacent to irradiation layer 22 and may extend out from emitter 14 to a predetermined distance to absorb some of the radiation emitted by emitter 14. Absorption material 26 may be substantially index matched to one or both of interface layer 20 and signal layer 24, thereby ensuring that substantially any angles of incident light that would not be totally internally reflected at the boundary between irradiation layer 22 and interface layer 20 and/or the boundary between irradiation layer 22 and signal layer 24 may be absorbed. Absorption material 26 may be applied by print, by paint, by UV cure, by heat cure, or by other methods. Absorption material 26 may include paint, silicone, polymer, emerald, or other materials.

Returning to FIG. 1, in some instances, the difference between the first index of refraction and the second index of refraction may create a total internal reflection mirror at the boundary between interface layer 20 and irradiation layer 22. The total internal reflection mirror at the boundary between interface layer 20 and irradiation layer 22 may have a predetermined critical angle (illustrated in FIG. 1 as $\theta_1$). Electromagnetic radiation (illustrated in FIG. 1 as electromagnetic radiation 36) that becomes incident on the total internal reflection mirror formed between interface layer 20 and irradiation layer 22 from within irradiation layer 22 with an angle of incidence (illustrated in FIG. 1 as $\phi_1$) greater than critical angle $\theta_1$ may be reflected back into irradiation layer 22 by total internal reflection.

As shown in FIG. 1, signal layer 24 may be defined by a first surface 38, a second surface 40, and may be formed from a transparent material having a third index of refraction. In some instances, the third index of refraction is less than the second index of refraction. In instances in which interface layer 20 is formed from a transparent material, the third index of refraction may be less than the second index of refraction but greater than the first index of refraction. Signal layer 24 may be disposed within waveguide 18 adjacent to irradiation layer 22 such that first surface 38 of signal layer 24 is at or near second surface 34 of irradiation layer 22. The difference between the second index of refraction and the third index of refraction may create a total internal reflection mirror at the boundary between irradiation layer 22 and signal layer 24 with a predetermined critical angle (illustrated in FIG. 1 as $\theta_2$). The total internal reflection mirror formed at the boundary between irradiation layer 22 and signal layer 24 may totally internally reflect electromagnetic radiation (illustrated in FIG. 1 as electromagnetic radiation 36) that is incident on the total internal reflection mirror from within irradiation layer 22 at an angle of incidence (illustrated in FIG. 2 as $\phi_2$) greater than critical angle $\theta_2$. For various purposes, some of which are discussed below, the material (or materials) used to form signal layer 24 may be relatively rigid.

In some implementations (not shown), one or more auxiliary and/or boundary layers may be disposed between irradiation layer 22 and signal layer 24. In these implementations, the additional layers may be transparent, and may be formed with an appropriate index of refraction (or indices of refraction) so as to form one or more total internal reflection mirrors. The one or more total internal reflection mirrors formed by the auxiliary and/or boundary layers may perform some or all of the functionality described herein as being provided by the total internal reflection mirror formed at conjunction of surfaces 34 and 38 in the implementation illustrated in FIG. 1.

Signal layer 24 may be bounded on second side 40 by a base layer 42. Base layer 42 may be defined by a first surface 44 and a second surface 46. In some implementations, such as the implementations illustrated in FIG. 1, base layer 42 may be included as a layer in waveguide 18. In these implementations, second surface 46 may comprise a mounting surface configured to be mounted to a base object. The base object may include virtually any object on which touchpad system 10 may be used as a touchpad. For example, the base object may include an electronic display (e.g., a display monitor, a mobile device, a television, etc.), a keypad, a keyboard, a button, an appliance (e.g., a stove, an air conditioner unit, a washing machine, etc.), a control panel (e.g., an automobile control panel, an airplane control panel, etc.), or other base objects.

In some instances, base layer 42 may be formed from a material with a fourth index of refraction less than the third index of refraction such that a total internal reflection mirror may be formed at the boundary between signal layer 24 and base layer 42. The total internal reflection mirror formed between signal layer 24 and base layer 42 may have a predetermined critical angle $\theta_3$. Electromagnetic radiation incident on the total internal reflection mirror from within signal layer 24 at an angle of incidence greater than critical angle $\theta_3$ may be totally internally reflected back into signal layer 24.

As was mentioned above, in some implementations, base layer 42 may not be included as a layer in waveguide 18. In these implementations, base layer 42 may be formed as an integral part of the base object on which waveguide 18 is disposed. For instance, base layer 42 may include a glass (or other suitable material) layer that forms the screen of an electronic or other display. In other implementations (not shown), base layer 42 may be included in waveguide 18 as a composite layer formed from a plurality of sub-layers.

As is illustrated in FIG. 1, signal layer 24 may be optically coupled to detectors 16 to provide electromagnetic radiation thereto, as will be discussed further below. In some implementations, detectors 16 may be integrally formed within, or positioned directly adjacent to, signal layer 24 to receive electromagnetic radiation from signal layer 24. In some other implementations, additional optical components (not shown) may be provided to direct radiation from signal layer 24 to detectors 16. For example, the additional optical components may include one or more optical fibers and/or other components capable of guiding electromagnetic radiation.

As was previously discussed, in some implementations, interface layer 20 and/or base layer 42 may be transparent. This may enable a user of touchpad system 10 to view an image through waveguide 18 (e.g., formed on the base object). For instance, in these implementations the user may view an image formed by an electronic or other display (e.g., backlit display, reflective display, etc.), a printed image formed on the base object beneath waveguide 18, or other images formed by the base object. As was discussed above with respect to interface layer 20, in some implementations, interface layer 20 and/or base layer 42 may include a plurality of layers including at least one layer that is substantially opaque. In this implementations, the substantially opaque layer may be bounded by a transparent layer having an index of refraction that enables total internal reflection at the boundary of interface layer 20 and/or base layer 42 as described above. However, in other implementations, all or a portion of one or both of interface layer 20 and base layer 42 may be substantially opaque, and radiation may be reflected within waveguide 18 at the boundary between interface layer 20 and irradiation layer 22 (e.g., first surface 32), and/or the boundary between signal layer 24 and base layer 42 by reflection other than total internal reflection. For example, the reflection may be a product of a reflective layer or coating disposed at these boundaries to reflect electromagnetic radiation back into irradiation layer 22 and/or signal layer 24. As another example, one or more interference mirrors may be provided to reflect radiation appropriately at these boundaries.

Figure 3:
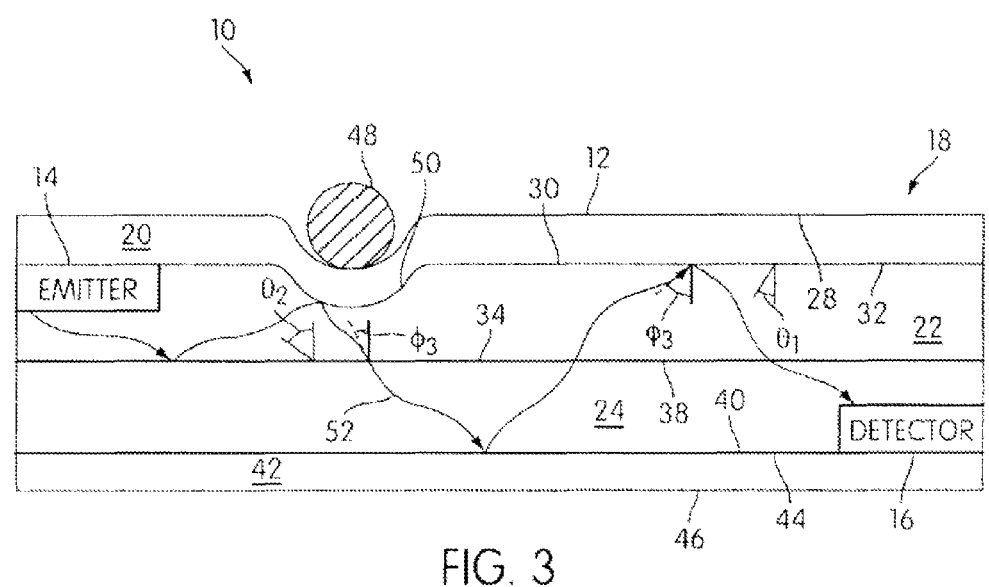
FIG. 3 illustrates a side elevation of an optical touchpad system being engaged by an object, in accordance with one or more embodiments of the invention.

FIG. 3 illustrates one or more aspects of the operation of optical touchpad system 10, according to one or more implementations of the invention. In FIG. 3 a user has engaged interface surface 12 with an object 48 (e.g., a stylus, a fingertip, etc.). The force of the engagement between object 48 and interface surface 12 may deform interface layer 20 into waveguide 18, thereby compressing the relatively pliable irradiation layer 22, forming an indention 50 in first surface 32. Due to the irregularity of first surface 32 at indention 50, a portion of the electromagnetic radiation (illustrated in FIG. 3 as electromagnetic radiation 52) emitted by emitters 14 and trapped within irradiation layer 22 by total internal reflection between irradiation layer 22 and signal layer 24 may be deflected such that it becomes incident on the total internal reflection mirror formed between irradiation layer 22 and signal layer 24 at an angle of incidence (illustrated in FIG. 2 as $\phi_3$) less than the critical angle $\theta_2$ of this total internal reflection mirror. Rather than remaining trapped within irradiation layer 22 by total internal reflection, electromagnetic radiation 52 may pass through the total internal reflection mirror formed at the boundary of irradiation layer 22 and signal layer 24, and into signal layer 24. Electromagnetic radiation 52 that passes into signal layer 24 may be reflected at the boundary between signal layer 24 and base layer 42 back toward irradiation layer 22.

As can be seen in FIG. 3, electromagnetic radiation 52 may then be guided through waveguide 18 passing back and forth between signal layer 24 and irradiation layer 22 until it becomes incident on detectors 16 via signal layer 24. Based on the output signals generated by detectors 16 in response to the receipt of electromagnetic radiation 52, information related to the engagement between object 48 and interface surface 12 may be determined. For instance, the position of the engagement between object 48 and interface surface 12 with respect to interface surface 12 may be determined, the force applied to interface surface 12 by object 48 may be determined, or other information may be determined.

It should be appreciated that although irradiation layer 22 is illustrated in FIG. 3 as being pliable, and signal layer 24 is illustrated in FIG. 3 as being relatively rigid, that this disclosure is not intended to be limiting. For instance, irradiation layer 22 may be formed from a relatively rigid material and signal layer 24 may be formed from a relatively pliable material. In such a configuration, engagement of object 48 with interface surface would deform waveguide 18 such that indention 50 would still be formed in first surface 32 and a corresponding indention would also be formed at the boundary between irradiation layer 22 and signal layer 24.

It should further be appreciated that the configuration of waveguide 18 with irradiation layer 22 disposed between signal layer 24 and interface surface 12 is not intended to be limiting. For example, in other implementations, the positions of irradiation layer 22 and signal layer 24 in FIG. 3 may be switched. In these implementations various aspects of the operation of optical touchpad system 10 may remain unchanged. For instance, in these implementations, an indentation may be formed in irradiation layer 22 as a result of an engagement between interface surface 12 and an object, and the indentation may enable radiation to be leaked from irradiation layer 22 to signal layer 24. The leaked radiation may then be directed to detectors 16 at least in part by total internal reflection at a boundary of signal layer 24 opposite from irradiation layer 22.

Figure 4:
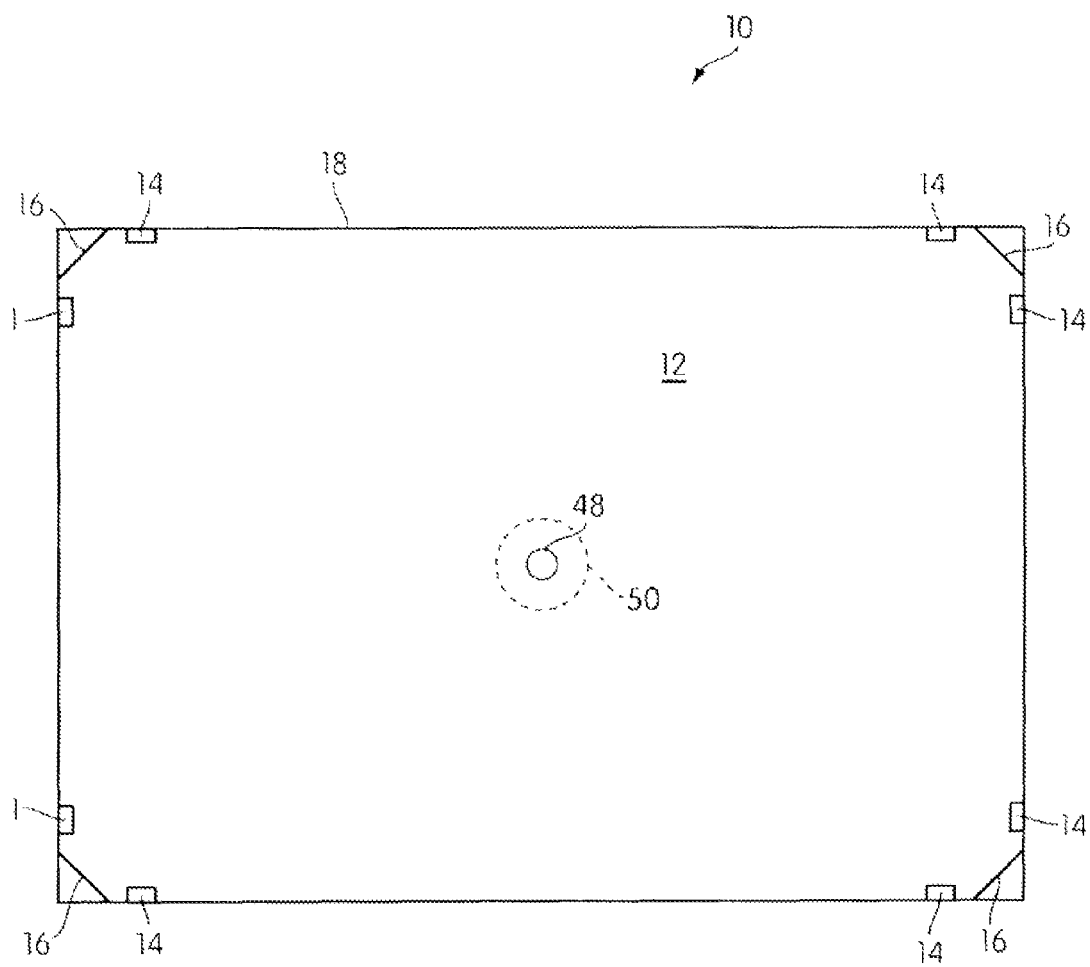
FIG. 4 illustrates a aerial view of an optical touchpad system, according to one or more embodiments of the invention.

FIG. 4 illustrates a top view of optical touchpad system 10, according to one or more implementations of the invention. In the implementations illustrated in FIG. 4, waveguide 18 provides a substantially rectangular interface surface 12 with clusters of emitters 14 and detectors 16 provided at each corner. It should be appreciated that this shape of interface surface 12 and arrangement of emitters 14 and detectors 16 is for illustrative purposes only, and that alternative configurations of these features are contemplated. For instance, in other implementations, arrays of emitters and detectors may be disposed substantially adjacent to each other in a manner that generally surrounds waveguide 18 with emitters and detectors. Other configurations are also contemplated.

Detectors 16 in the implementations of FIG. 4 may include directional sensors adapted to determine the direction of a source of radiation. For example, each of detectors 16 may include an optical element and a line sensor, wherein the optical element directs electromagnetic radiation onto the line sensor in such a manner that the direction of the source of the electromagnetic radiation can be determined. For instance, the optical element may include one or more apertures, and/or may incorporate a refractive element. Some implementations of suitable directional sensors are described in U.S. patent application Ser. No. 10/507,018, filed Mar. 12, 2003, and entitled "TOUCH PAD, A STYLUS FOR USE WITH THE TOUCH PAD, AND A METHOD OF OPERATING THE TOUCH PAD".

As object 48 is engaged with interface surfaced 12, indention 50 created by this engagement causes a portion of the electromagnetic radiation emitted into waveguide 18 by emitters 14 to be deflected out of irradiation layer 22 into signal layer 24 (as was illustrated in FIG. 3). In effect, this introduction of electromagnetic radiation into signal layer 24 acts similar to a source of electromagnetic radiation emitting the electromagnetic radiation into signal layer 24. Thus, as the electromagnetic radiation deflected into signal layer 24 reaches detectors 16, each of detectors 16 outputs one or more output signals that enable detection of the direction of indention 50 with respect to that detector 16. Using conventional triangulation techniques, detections of the direction to indention 50 with respect to detectors 16 based on the output signals of detectors 16 may be combined to determine the position of the engagement between object 48 and interface layer 12 (e.g., indentation 50). It should be appreciated that although FIG. 4 illustrates optical touchpad system 10 as including four detectors 16 (which would enable four separate directional detections of indentation 50), other implementations may employ triangulation using more or less detectors 16.

In some implementations, the emission of electromagnetic radiation from emitters 14 may be modulated so that electromagnetic radiation emitted by one or more of emitters 14 may be differentiated from electromagnetic radiation emitted by others of emitters 14. For instance, in the implementation illustrated in FIG. 4, the emission of electromagnetic radiation by each of emitters 14 may be amplitude modulated at different frequencies. This may enable, based on the output signals of a given one of detectors 16, determination of a direction from the given detector 16 in which an engagement between object 48 and interface surface 12 as described above, but it may further enable a determination as to the amount of electromagnetic radiation from each of emitters 14 that is being guided from the engagement to the given detector 16. Implementations including this feature of modulation (e.g., amplitude modulation) of the electromagnetic radiation emitted by emitters 14 may demonstrate an augmented ability to discern information (e.g., position information, pressure information, etc.) related to simultaneous engagements between two or more objects and interface surface 12 at different positions (e.g., information about two separate engagements between two different fingertips of a user and interface surface 12).

It should be appreciated that the implementation described above, in which each of emitters 14 in FIG. 4 are modulated to enable differentiation between the electromagnetic radiation emitted by each of the various emitters 14 is not intended to be limiting. For example, emitters 14 may be frequency modulated and/or controlled (e.g., modulating or otherwise controlling the color of the light emitted by emitters 14) rather than amplitude modulated. As another example, in other implementations groups of emitters may be modulated in a substantially identical manner to enable differentiation between electromagnetic radiation emitted by the different groups of emitters 14. As an example of this in optical system 10 illustrated in FIG. 4, the emitters 14 located at each corner of waveguide 18 may be amplitude modulated at the same frequency, which may be different than the modulation frequency of emitters 14 disposed at the other corners of waveguide 18.

As has been mentioned briefly above, information about the engagement between object 48 and interface surface 12 may be determined based on the output signals generated by detectors 16. For instance, information related to the force applied by object 48 onto interface surface 12 (e.g., the pressure of the engagement) may be determined. Referring back to FIG. 3, as the force applied by object 48 on interface surface 12 increases, object 48 may be pressed further into waveguide 18, thereby increasing the size of indention 50. As can be seen in FIG. 3, as the size of indention 50 increases, the amount of electromagnetic radiation traveling within irradiation layer 22 deflected by indention 50 also increases, which may cause an increase in the amount of electromagnetic radiation introduced into signal layer 24 that will eventually propagate within waveguide 18 to detectors 16 in the manner illustrated by FIG. 3. If irradiation layer 22 has a known pliability curve, emitters 14 emit a known quantity of electromagnetic radiation (e.g., a known number of photons), and detectors 16 have a known quantum efficiency, then the force applied to interface surface 12 by object 48 may be determined from a calculation of the amount of electromagnetic radiation guided to detectors 16 based on the output signals generated by detectors 16.

In some implementations, emitters 14 and/or detectors 16 may be operatively coupled to one of more processors. The processors may be operable to control the emission of electromagnetic radiation from emitters 14, receive and process the output signals generated by detectors (e.g., to calculate information about engagements between objects and interface surface 12 as described above), or provide other processing functionality with respect to optical touchpad system 10. In some instances, the processors may include one or more processors external to optical touchpad system 10 (e.g., a host computer that communicates with optical touchpad system 10), one or more processors that are included integrally in optical touchpad system 10, or both. For example, the processors may include one or more semi-conductive device (e.g., an ASIC, an FPGA, etc.), or other processors, integrated with one or more of detectors 16. These processors may be operatively connected with one or more external processors. The external processors may, in some cases, provide redundant processing to the processors that are integrated with detectors 16, and/or the external processor may provide additional processing to determine additional information related to an engagement between interface surface 12 and an object. For instance, the integrated processors may determine a position of the engagement and the external processors may determine a force applied by the object to interface surface 12.

Figure 5:
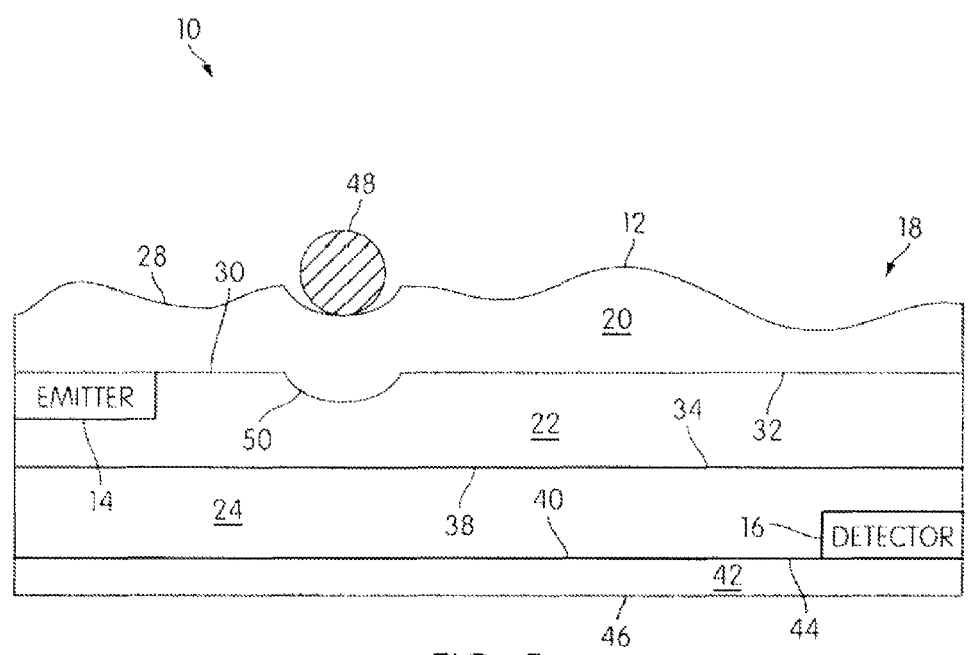
FIG. 5 illustrates a side elevation view of an optical touchpad system with an interface surface that has a non-planar topology, in accordance with one or more embodiments of the invention.

Referring to FIG. 5, optical touchpad system 10 is illustrated including an alternative interface layer 20, according to one or more implementations of the invention. As illustrated in FIG. 5, interface layer 20 may be of varying thickness such that interface surface 12 is provided with a non-planar topology. This feature may be implemented in instances in which interface layer 20 includes transparent and/or opaque materials. Unlike some other optical touchpad systems, the irregular topology of interface surface 12 may not interfere with determining accurate information related to the engagement between object 48 and interface surface 12 in part because optical touchpad surface 10 may not require electromagnetic radiation to pass into and out of waveguide 18 at interface surface 12 in a regular or predictable manner in order to operate.

Due to this ability to provide reliable information about the engagement between object 48 and interface surface 12 when interface surface 12 has a non-planar topology and/or is opaque, optical touchpad system 10 may be suitable for a variety of applications where other conventional optical touchpads may not produce reliable results. For example, optical touchpad system 10 may be configured such that clearly formed buttons are formed in interface surface 12 (e.g., as individual raised areas). These buttons may even incorporate raised and/or depressed portions formed on individual buttons (e.g., for Braille markings on the buttons, which may enhance a human/machine interface designed for blind individuals, etc.). In some instances, optical touchpad system 10 may be formed such that interface surface 12 forms an entire keyboard (e.g., a QWERTY keyboard, a Latin keyboard with a different configuration, a keyboard comprising characters other than Latin, etc.) and scroll pad area as a single unit such that optical touchpad system 10 may be incorporated into a laptop computer as the input portion of the computer. Similarly, optical touchpad system 10 may be provided as the keypad in a remote control, a mobile phone, a personal digital assistant, or other wireless client device. In other instances, the topology of interface surface 12 may be shaped into a game controller (e.g., a joystick, etc.) with one or more directional inputs, one or more buttons, and/or one or more other control inputs.

The ability to provide reliable information about the engagement between object 48 and interface surface 12 when interface surface 12 has a non-planar topology and/or is opaque may further enable users to alter and/or customize interface surface 12. For example, a user may provide opaque markings on interface surface 12 (e.g., by pen, by sticker, etc.). As another example, a user may provide customized topographic features to interface surface 10. For instance, a blind user may provide a interface surface 12 with Braille and/or other symbols to facilitate control over an electronic apparatus. As another example, the user may create a customizable interface (e.g., a keyboard) by placing topographical features (e.g., keys, buttons, joysticks, etc.) on interface surface 12. Other uses of this feature of enabling user alteration and/or customization of interface surface 12 exist.

In some implementations, one or more of emitters 14, detectors 16, electronic circuitry, or other components of optical touchpad system 10 may be integrally formed with waveguide 18. For example, these components may be printed, laminated, or otherwise integrally formed within one or more of layers 20, 22, 24, or 42 prior to, or concurrent with, the combination of layers 20, 22, 24, and/or 42 in waveguide 18. This may reduce an overall cost of manufacturing optical touchpad system 10, enhance a robustness or ruggedness of optical touchpad system 10, increase an accuracy of alignment of the components in optical touchpad system 10, or provide other advantages. In some instances, one or more of emitters, 14, detectors 16, electronic circuitry, or other components may be formed integrally into one or more waveguide layers separate from waveguide 18, and then the one or more separate waveguide layers may be attached to waveguide 18 to optically couple the components formed on the separate waveguide layer(s) with irradiation layer 22 and/or signal layer 24.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. An optical touchpad system comprising:
   one or more emitters configured to emit electromagnetic radiation;
   one or more sensors configured to receive electromagnetic radiation and output one or more output signals that correspond to one or more properties of the received electromagnetic radiation;
   a waveguide that guides a portion of the electromagnetic radiation emitted by the emitters to the sensors, the waveguide comprising:
   an irradiation layer that is optically coupled to the one or more emitters to receive electromagnetic radiation emitted therefrom,
   an interface surface spaced apart from the irradiation layer, the interface surface being configured to be engaged by a user with an object; and
   a signal layer separate from the irradiation layer that is optically coupled to the one or more sensors,
   wherein the waveguide is configured such that (i) if the interface surface is not deformed, the electromagnetic radiation received by the irradiation layer from the one or more emitters is kept wholly within the irradiation layer by total internal reflection, and (ii) if the interface surface is engaged with the object such that the engagement therebetween causes a local deformation in the irradiation layer, wherein a first portion of an irradiation layer surface is deformed while a second portion of the irradiation layer surface is not deformed, such local deformation of the irradiation layer causing the portion of the electromagnetic radiation incident on the local deformation to be reflected towards the signal layer at an angle such that the portion of the electromagnetic radiation reflected at the local deformation is leaked from the irradiation layer into the signal layer and guided to the one or more sensors at least in part by reflection within the signal layer.

2. The optical touchpad system of claim 1, further comprising one or more processors operatively coupled to the one or more sensors to receive the one or more output signals generated by the sensors, wherein the one or more processors determine the position on the interface surface of the engagement between the object and the interface surface based on the one or more output signals generated by the one or more sensors.

3. The optical touchpad system of claim 1, wherein the irradiation layer is bounded on one side by a first surface that is generally planar and on a side opposite the first surface by a second surface that is generally planar and generally parallel to the first surface, and wherein the electromagnetic radiation trapped within the irradiation layer at least in part by total internal reflection is reflected at the first surface and totally internally reflected at or near a total internal reflection mirror formed at the second surface.

4. The optical touchpad system of claim 3, wherein the electromagnetic radiation reflected at the first surface is reflected by a total internal reflection mirror formed at or near the first surface.

5. The optical touchpad system of claim 3, wherein the local deformation of the irradiation layer comprises a local deformation of the first surface such that at least a portion of the electromagnetic radiation reflected by the first surface at the local deformation of the first surface is deflected out of the irradiation layer and into the signal layer.

6. The optical touchpad system of claim 1, wherein the irradiation layer has a first index of refraction and the signal layer has a second index of refraction that is lower than the first index of refraction.

7. The optical touchpad system of claim 6, wherein the signal layer is formed directly adjacent to the irradiation layer such that the boundary between the signal layer and the irradiation layer forms a total internal reflection mirror.

8. The optical touchpad system of claim 1, further comprising an interface layer that is bounded on one side by the interface surface, wherein at least a first portion of the interface layer at the interface surface is substantially opaque and at least a second portion of the interface layer at the interface surface is substantially transparent.

9. The optical touchpad system of claim 1, further comprising an interface layer that is bounded on one side by the interface surface and on a side opposite from the interface surface by the irradiation layer.

10. The optical touchpad system of claim 1, wherein the interface surface has topologically irregular features.

11. The optical touchpad system of claim 10, wherein the topographically irregular features comprise one or more of a key, a button, or a joystick.

12. The optical touchpad system of claim 10, wherein topologically irregular features comprise one or more topological features selectively positioned on the interface surface by a user to customize the interface surface.

13. A waveguide configured to receive electromagnetic radiation from one or more emitters and guides a portion of the received electromagnetic radiation to one or more sensors, the waveguide comprising:
a irradiation layer configured to be optically coupled to the one or more emitters to receive electromagnetic radiation emitted therefrom;
an interface surface spaced apart from the irradiation layer, the interface surface being configured to be engaged by a user with an object; and
a signal layer separate from the irradiation layer configured to be optically coupled to the one or more sensors;
wherein the waveguide is configured such that:
if the irradiation layer is receiving electromagnetic radiation from an optically coupled emitter, and if the interface surface is not deformed, the electromagnetic radiation received by the irradiation layer from the optically coupled emitter is kept wholly within the irradiation layer by total internal reflection, and
if the interface surface is engaged with the object and if there is electromagnetic radiation trapped within the irradiation layer at least in part by total internal reflection, the engagement between the object and the interface surface causes a local deformation in the irradiation layer, wherein a first portion of an irradiation layer surface is deformed while a second portion of the irradiation layer surface is not deformed, such local deformation of the irradiation layer causes the portion of the electromagnetic radiation incident on the local deformation to be reflected towards the signal layer at an angle such that the portion of the electromagnetic radiation reflected at the local deformation is (i) leaked from the irradiation layer into the signal layer and (ii) guided to the one or more sensors by reflection within the signal layer.

14. The waveguide of claim 13, wherein the irradiation layer is bounded on one side by a first surface that is generally planar and on a side opposite the first surface by a second surface that is generally planar and generally parallel to the first surface, and wherein the electromagnetic radiation trapped within the irradiation layer at least in part by total internal reflection is reflected at the first surface and totally internally reflected at or near a total internal reflection mirror formed at the second surface.

15. The waveguide of claim 14, wherein the electromagnetic radiation reflected at the first surface is reflected by a total internal reflection mirror formed at or near the first surface.

16. The waveguide of claim 14, wherein the local deformation of the irradiation layer comprises a local deformation of the first surface such that at least a portion of the electromagnetic radiation reflected by the first surface at the local deformation of the first surface is deflected out of the irradiation layer and into the signal layer.

17. The waveguide of claim 13, wherein the irradiation layer has a first index of refraction and the signal layer has a second index of refraction that is lower than the first index of refraction.

18. The waveguide of claim 17, wherein the signal layer is formed directly adjacent to the irradiation layer such that the boundary between the signal layer and the irradiation layer forms a total internal reflection mirror.

19. The waveguide of claim 13, further comprising an interface layer that is bounded on one side by the interface surface, wherein the interface layer is substantially opaque.

20. The waveguide of claim 13, further comprising an interface layer that is bounded on one side by the interface surface and on a side opposite from the interface surface by the irradiation layer.

21. The waveguide of claim 13, wherein the interface surface has topologically irregular features.

22. The waveguide of claim 21, wherein the topographically irregular features comprise one or more of a key, a button, or a joystick.

23. The waveguide of claim 21, wherein topologically irregular features comprise one or more topological features selectively positioned on the interface surface by a user to customize the interface surface.

* * * * *